United States Patent [19]

Cadeddu

[11] 4,199,949
[45] Apr. 29, 1980

[54] HYDRAULIC MASTER CYLINDER

[75] Inventor: Leonardo Cadeddu, Crema, Italy

[73] Assignee: Benditalia S.p.A., Crema, Italy

[21] Appl. No.: 841,785

[22] Filed: Oct. 13, 1977

[30] Foreign Application Priority Data

Oct. 15, 1976 [IT] Italy ................................ 28356 A/76
Jul. 12, 1977 [IT] Italy ................................ 25626 A/77

[51] Int. Cl.² ............................................ B60T 11/28
[52] U.S. Cl. ...................... 60/589; 137/860; 277/205
[58] Field of Search .............. 60/585, 588, 589, 592; 137/853, 860; 251/210; 277/205

[56] References Cited

U.S. PATENT DOCUMENTS

| 3,165,896 | 1/1965 | Baldwin | 60/562 |
| 3,264,006 | 8/1966 | Downs | 137/860 |
| 3,300,973 | 1/1967 | Baldwin | 60/588 |
| 3,800,541 | 4/1974 | Sindelar | 60/589 |

FOREIGN PATENT DOCUMENTS

| 1109715 | 10/1954 | France | 60/588 |
| 985098 | 3/1965 | United Kingdom | 60/585 |

Primary Examiner—Abraham Hershkovitz
Attorney, Agent, or Firm—Leo H. McCormick, Jr.; Ken C. Decker

[57] ABSTRACT

A master cylinder for a vehicle braking system. The master cylinder including a housing defining a bore therewithin with a piston slidably mounted in said bore. The piston head and the housing bore define a pressure chamber in communication with at least one brake actuator. A conventional annular ring cooperates with the wall of the housing bore and with a radial surface of the piston head for controlling fluid communication between a supply chamber of the master cylinder which communicates with a reservoir and the pressure chamber. The annular ring has a lip which projects toward the radial surface so as to form a non-return valve which prevents fluid communication from the pressure chamber toward the supply chamber when the master-cylinder piston is out of its rest position.

8 Claims, 6 Drawing Figures

HYDRAULIC MASTER CYLINDER

HYDRAULIC MASTER CYLINDER

BACKGROUND OF THE INVENTION

The present invention relates to a hydraulic master cylinder, in particular for controlling actuation of braking circuit of a motor vehicle.

A hydraulic master-cylinder has already been proposed having a housing defining a bore therewithin, inside which is disposed a piston which separates the bore into a supply chamber connected to a fluid reservoir, and a pressure chamber connected to a utilization circuit. The piston of this master cylinder has a radial shoulder which cooperates with an annular ring, generally of elastomeric material to establish a valve which prevents fluid communication between the supply chamber and the pressure chamber during actuation of the piston, while allowing limited communication during the return stroke of the piston when a further supply of liquid in the pressure chamber is required, resulting from a leakage made in the utilisation circuit, or from a bleeding operation of this circuit. During movement of the piston, closure of the communication between the supply and pressure chambers, is obtained by abutment of the radial shoulder against one of the lateral radial faces of the annular sealing ring, the peripheral surface of which is in sealing contact with the internal wall of the bore.

It has been noted that, in the event that the vehicle brakes are actuated in a jerky manner, for example during a partial brake pedal release followed by a rapid reapplication of said pedal, there results a substantial loss in the piston stroke. This loss in pedal stroke occurs during the return stroke of the piston because the annular ring may slightly disengage from the radial shoulder of the piston even though the pressure in the brakes is maintained at a relatively high level. The decrease or even loss of fluid-tightness between the pressure and supply chambers occurs frequently when the partial release of the brake pedal is rapid and when the friction forces between the peripheral surface of the ring and the inner wall of the bore are great.

In order to overcome this drawback, a first solution has been proposed in French Patent Specification No. 1.440.394 of which U.S. Pat. No. 3,300,973 corresponds thereto, wherein a leaf spring urges the ring against the radial shoulder so as to avoid premature opening of fluid communication between the reservoir and the pressure chamber. However, this solution has not proved to be satisfactory since the force of the leaf spring must be compatible with the following opposing requirements: firstly this force must have a value sufficiently great to counterbalance the forces caused by friction between the ring and the housing bore, and secondly, this force must have a value sufficiently low to allow a rapid fluid supply toward the pressure chamber in the event of fluid depletion in said pressure chamber.

It has also been remarked that, when impurities or contaminants are present within the fluid of the hydraulic circuit, fluid tightness between the elastomeric ring and the piston shoulder cannot always perfectly be insured and there results a fluid leakage from the pressure chamber toward the supply chamber with as a consequence, a reduction in the piston stroke.

SUMMARY OF THE INVENTION

The object of the present invention is to overcome the above-mentioned drawbacks. More particularly according to the invention, the hydraulic master cylinder comprises a housing having a bore therewithin. A piston which is slidably mounted in the bore, separates a supply chamber adapted to be communicated to a fluid reservoir from a pressure chamber adapted to be communicated with a hydraulic utilization device. The piston has a head adjacent the pressure chamber with a radial shoulder thereon. A valve formed by an elastomeric annular ring is mounted on the piston head. The annular ring has a predetermined amount of radial play with respect to the radial shoulder on the piston and a stop. The annular ring engages the radial shoulder to control fluid communication between the supply chamber and the pressure chamber, such communication being allowed when the piston occupies its rest position and being normally interrupted when the piston is moved from its rest position. The ring has an annular resilient lip projecting therefrom toward the radial shoulder to define a non return valve which prevents fluid flow from the pressure chamber toward the supply chamber when the piston occupies a position away from its rest position.

The invention is now described by way of example, and other advantages will become apparent from the ensuing description.

DETAILED DESCRIPTION OF THE INVENTION

Figure 1:
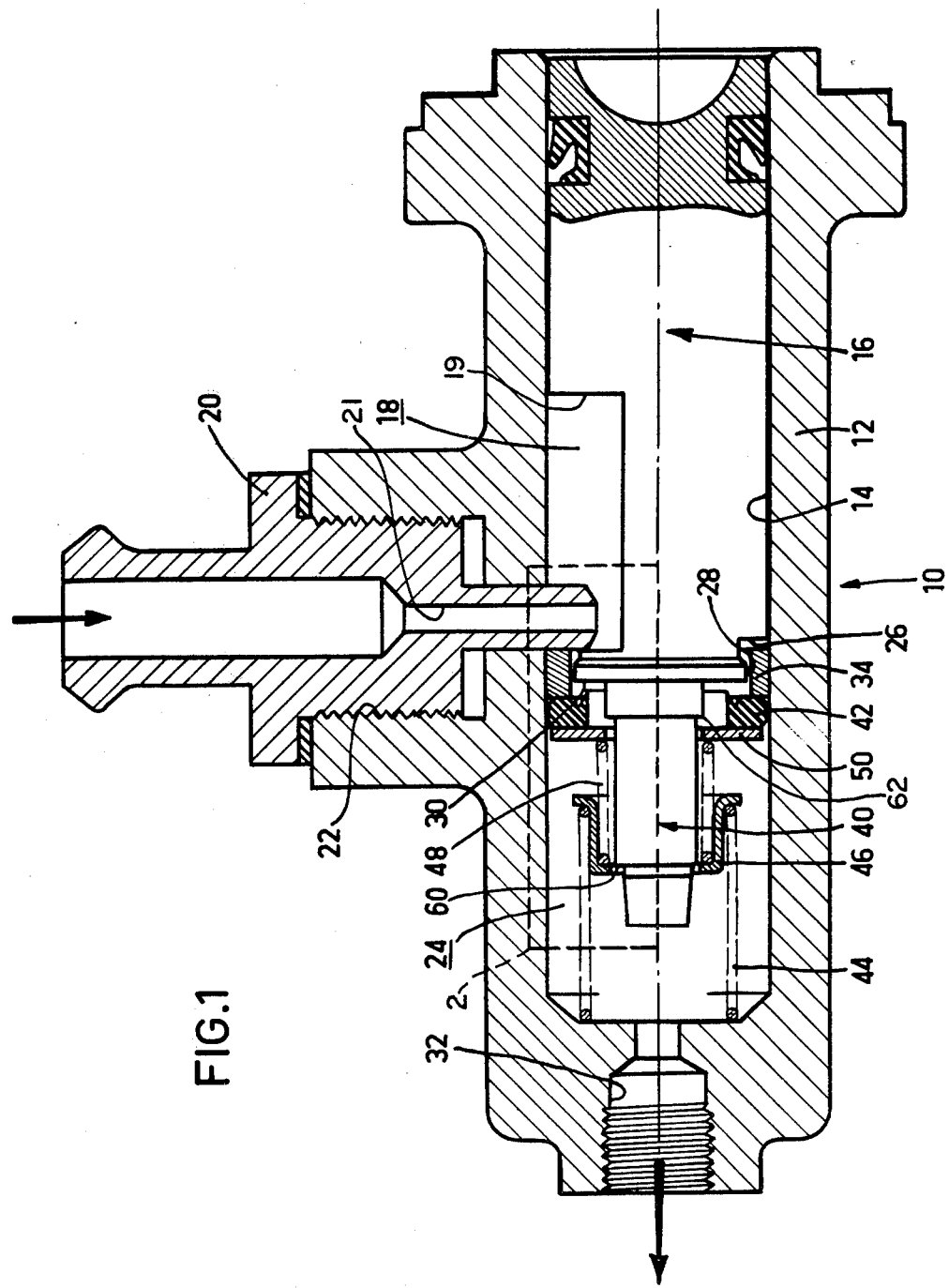
FIG. 1 is a sectional view of a hydraulic master cylinder made according to the invention, said master cylinder being illustrated in its rest position.
Figure 2:
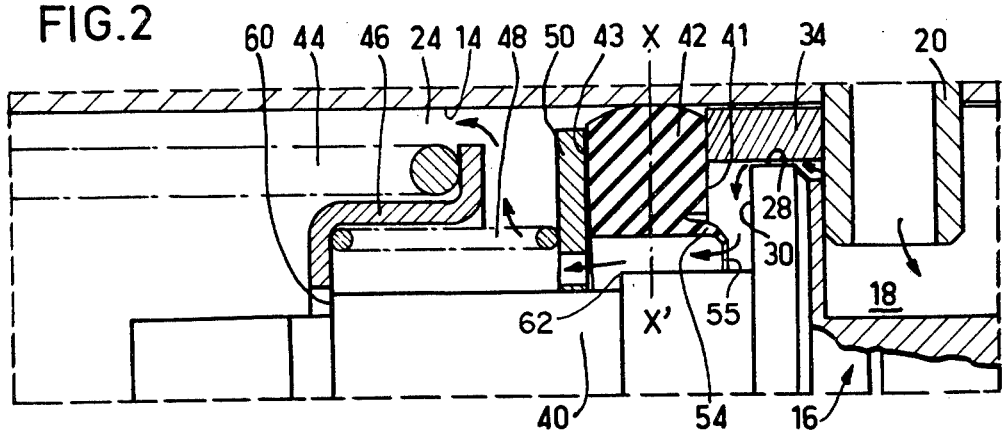
FIG. 2 is an enlarged view of the portion limited by dotted line 2 of the master cylinder illustrated in FIG. 1, showing the respective positions of various elements of the master-cylinder when the latter occupies its rest position.
Figure 3:
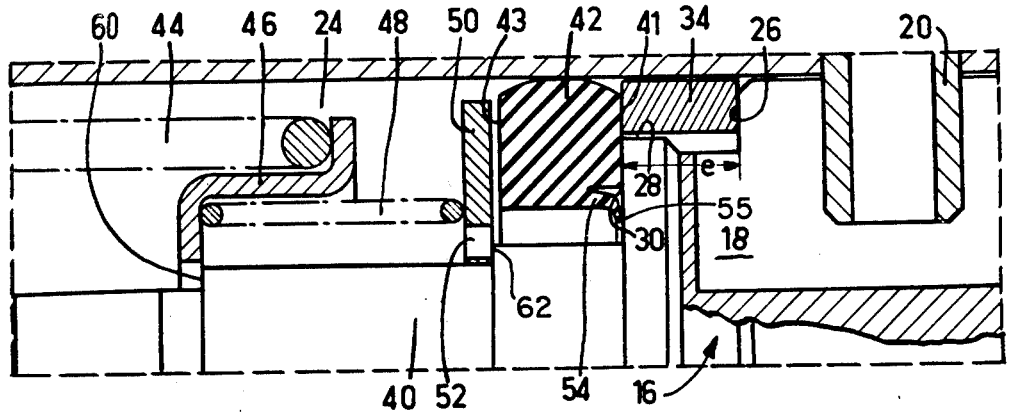
FIG. 3 is an enlarged view of the portion limited by dotted line 2 of the master-cylinder illustrated in FIG. 1, showing the respective positions of various elements of the master cylinder when the latter is operated during the forward stroke of the piston.

Considering now FIGS. 1 and 2, reference 10 designates a hydraulic master cylinder which is adapted to be used in the braking circuit of an automotive vehicle. The master cylinder 10 comprises a housing 12 with a bore 14 defined therewithin. A piston 16 is slidably mounted in bore 14 and is adapted to separate the bore 14 into a supply chamber 18 in communication with a fluid reservoir (not shown in the drawings) and into a pressure chamber 24 in communication, by way of an outlet orifice 32, with a utilization device which is constituted here by at least one brake actuator (not shown) associated with the vehicle wheels. The supply chamber 18 is formed by a longitudinal slot 19 provided in the piston 16 and the annular space defined between the housing bore 14 and a first reduced diameter portion of the piston. This annular space partly overlaps the longitudinal slot 19 and is limited by a first radial shoulder 26 situated in a plane intersecting the longitudinal slot 19. The longitudinal slot communicates with a fluid reservoir by means of a passage 21 in extension 20 of a refill plug screwed in a lateral orifice of the housing 12. The face of piston 16 adjacent to the pressure chamber 24 as best shown in FIGS. 1 and 3 comprises in this order the first radial shoulder 26, a cylindrical surface 28 having a diameter d 1 smaller than the diameter of the bore 14, and a second shoulder 30 adjacent to cylindrical surface 28.

A rigid spacer ring 34 is slidably disposed in the annular space which has been previously defined. However, there is provided some play between ring 34 and piston 16, to permit free fluid communication between the supply chamber 18 and the pressure chamber 24. Piston 16 also comprises a head 40 having a reduced diameter with respect to that of cylindrical surface 28. Head 40 projects from the surface defined by radial shoulder 30, toward the pressure chamber 24. An annular ring 42 made of elastomeric material is mounted adjacent the spacer ring 34, in the pressure chamber. Ring 42 respectively comprises a first and a second plane lateral faces 41 and 43 which respectively face the supply chamber 18 and the pressure chamber 24. The first lateral face 41, later termed contacting face, is adapted to come into contact against shoulder 30 of piston 16 to interrupt fluid communication between the supply chamber 18 and the pressure chamber 24. A lip 54 is associated to ring 42 such as to be disposed adjacent to the inner portion of the ring and projecting from the lateral face 41 toward the shoulder 30. In the embodiment shown in FIG. 1, the lip 54 is integral (by moulding for instance) with ring 42, but such a construction is not compulsory, and the lip 54 could as well be made of a material different from that of the ring 42. Lip 54 is adapted to cooperate with shoulder 30 so as to define a non-return valve when the piston is out of its rest position. As can be seen in FIG. 2, lip 54, in its non-deformed position is turned down towards the axial center of the elastomeric ring 42 and its free extremity 55 projects toward shoulder 30, beyond contacting face 41.

A return spring 44, disposed in pressure chamber 24, urges piston 16 towards its rest position by way of a cup 46, abutting a shoulder 60 provided at the vicinity of the free end of head 40. Another spring 48, having one end abutting cup 46, urges ring 42 in the direction of radial shoulder 30, by means of a rigid disc 50, abutting against the other lateral radial face 43 of ring 42. The head 40 also comprises another shoulder 62 to limit the movement of the rigid disc 50 in the direction of shoulder 30, so that, when the piston is displaced out of its rest position, the axial distance which separates the right end face of the disc 50 and shoulder 30 is slightly larger than the axial distance between lateral faces 41 and 43. As can be seen on the drawings, the difference between these two distances determines an axial play which is smaller than the maximal distance between the free end of lip 54 and the plane of the lateral contacting face 41, when the lip 54 occupies its non deformed position. Therefore, under normal operative conditions of the master cylinder, the free extremity of lip 54 is in sealing contact with shoulder 30.

Considering now more particularly FIG. 2 of the drawings, it should be noted that the spacer ring 34 abuts the end of plug 20 which penetrates into chamber 18. The piston 16 is repelled to the maximum to the right, when considering the drawings, under the action of spring 44, whereas ring 42 is now in contact with abutment ring 34. Accordingly, there is created a space between contacting face 41 of ring 42 and shoulder 30, so that fluid communication is free between the supply chamber 18 and the pressure chamber 24. The axial length of ring 34 is sufficient to disengage the contacting face 41 and the free extremity 55 of lip 54, from shoulder 30.

FIG. 3 shows the relative positions of various elements of the master cylinder during actuation of the brakes corresponding to a forward stroke of piston 16. The piston 16 moves toward the left so that the radial shoulder 30 comes into contact against the contacting face 41 of ring 42 to interrupt fluid communication between the supply chamber 18 and the pressure chamber 24. For any further movement of piston 16 toward the left, ring 42 moves together with piston 16 to compress the fluid contained in the pressure chamber 24. The axial distance "e" between shoulder 26 and shoulder 30, is preferably equal to the axial length of ring 34, so that during the compression phase, the peripheral portion of the elastomeric ring 42 is also supported by the spacer ring 34. In any case, for proper operation of the master-cylinder, distance "e" must be equal to or smaller than the axial length of the spacer ring 34, in order to avoid a parasitic separation of the elastomeric ring 42, from the shoulder 30. Moreover, it will be noted that, even when the contact between ring 42 and piston 16 is irregular, due to wear of the ring or impurities contained in the fluid, fluid tightness is however assured by lip 54 bearing on shoulder 30, and urged against the latter by the pressure prevailing in pressure chamber 24. Moreover, this pressure presses the ring 42 against the internal surface of the housing to insure a good peripheral tightness, even in case of slight deterioration of the outer surface of said ring.

When the piston 16 returns toward its rest position, the friction forces which act on ring 42 are such that face 41 is disengaged from shoulder 30 until face 43 comes into abutment on rigid ring 50. After this occurence a small relative movement between ring 42 and piston head 40, spring 48 is sufficiently strong to move ring 42 together with piston 16. In this case, as long as the pressure which prevails in pressure chamber 24 is greater than that prevailing in supply chamber 18, lip 54 remains in contact with shoulder 30 so as to insure fluid tightness and thereby avoiding any premature communication between chambers 24 and 18. The check valve 54 created by the lip guarantees fluid tightness between the pressure chamber 24 and the supply chamber 18 even in the presence of significant friction force between the outer periphery of the ring 42 and the inner wall of the bore 14 which tends to separate the ring 42 from the shoulder 30 before the end of the return stroke of the piston. In the event the vehicle brakes are actuated in a jerky manner, with a partial brake pedal release followed by a rapid reapplication of said pedal, the fluid tightness between the pressure chamber 24 and the supply chamber 18 is guaranteed by the lip 54 which remains in contact with shoulder 30, avoiding a sharp decrease of the pressure prevailing in the pressure chamber and also avoiding a dangerous increase of the lost motion of the piston in the case of successive and relatively short actuations by the driver.

Figure 4:
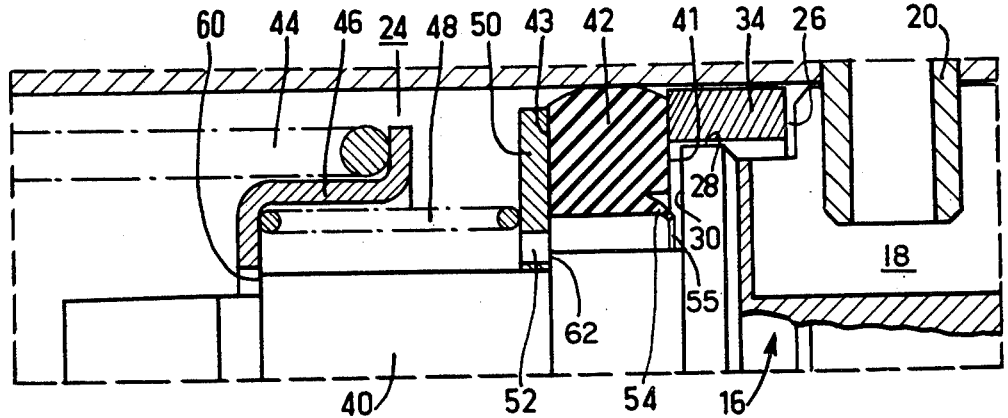
FIG. 4 is an enlarged view of the portion limited by dotted line 2 of the master cylinder illustrated in FIG. 1 showing the respective positions of various elements of the master cylinder, corresponding to a fluid supply phase during the return stroke of the piston.

FIG. 4 shows the relative positions of various elements of the master cylinder during a supply phase corresponding to the return stroke of the piston 16, in pressure chamber 24. In this case piston 16, which has not yet reached its rest position shown at FIG. 2, moves to the right under the influence of spring 44, whereas ring 42 is urged by spring 48 and rigid ring 50.

Lip 54 is thereby resiliently deformed under the influence of the pressure difference between the supply chamber 18 and the pressure chamber 24, to allow fluid supply toward the pressure chamber. This pressure decrease phenomenon occurs, for instance, in the event that the fluid which returns from the brake actuators is delayed, or also by reason of leakage in the utilization circuit or following a bleeding operation.

Figure 5:
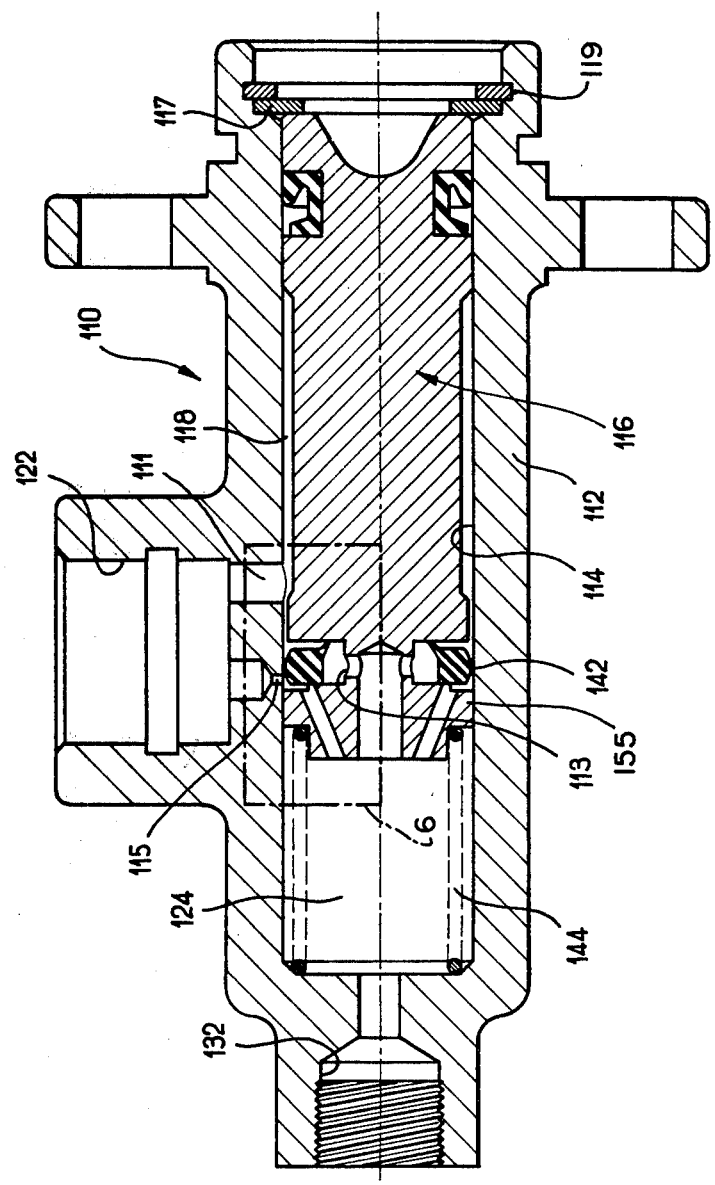
FIG. 5 is a sectional view of a second embodiment of a hydraulic master cylinder made according to the invention, said master cylinder being illustrated in its rest position.

Considering now FIG. 5, reference 110, designates a master-cylinder having a housing 112 which has a bore 114 therewithin. A piston 116 is slidably mounted in the bore 114. Piston 116 separates the bore 114, in a usual manner, into an annular space 118 and a pressure chamber 124. The master-cylinder also comprises a nipple 122 adapted to be connected to a fluid reservoir. The annular space 118 is also permanently connected to the nipple 122 by a radial orifice 111. The pressure chamber 124 is connected to at least a brake actuator (not shown) by means of an outlet orifice 132. The piston head 150, separates the annular space or supply chamber 118 from the pressure chamber 124. An annular groove 113 in piston 116 adjacent head 150 retains an annular ring 142. The annular ring 142 is mounted with axial clearance, and is adapted to cooperate in a known manner, with a compensation orifice 115 connected to the fluid reservoir (not shown), to control fluid communication between said reservoir and the pressure chamber 124, during movement of the piston 116. It should be noted that piston 116 is urged into its rest position by a spring 144 which is disposed in the pressure chamber 124, and which abuts against the end face of the latter. Moreover, the piston stroke toward the right is limited by stop means 117 formed by retainer maintained in the housing bore by a snap ring 119.

Figure 6:
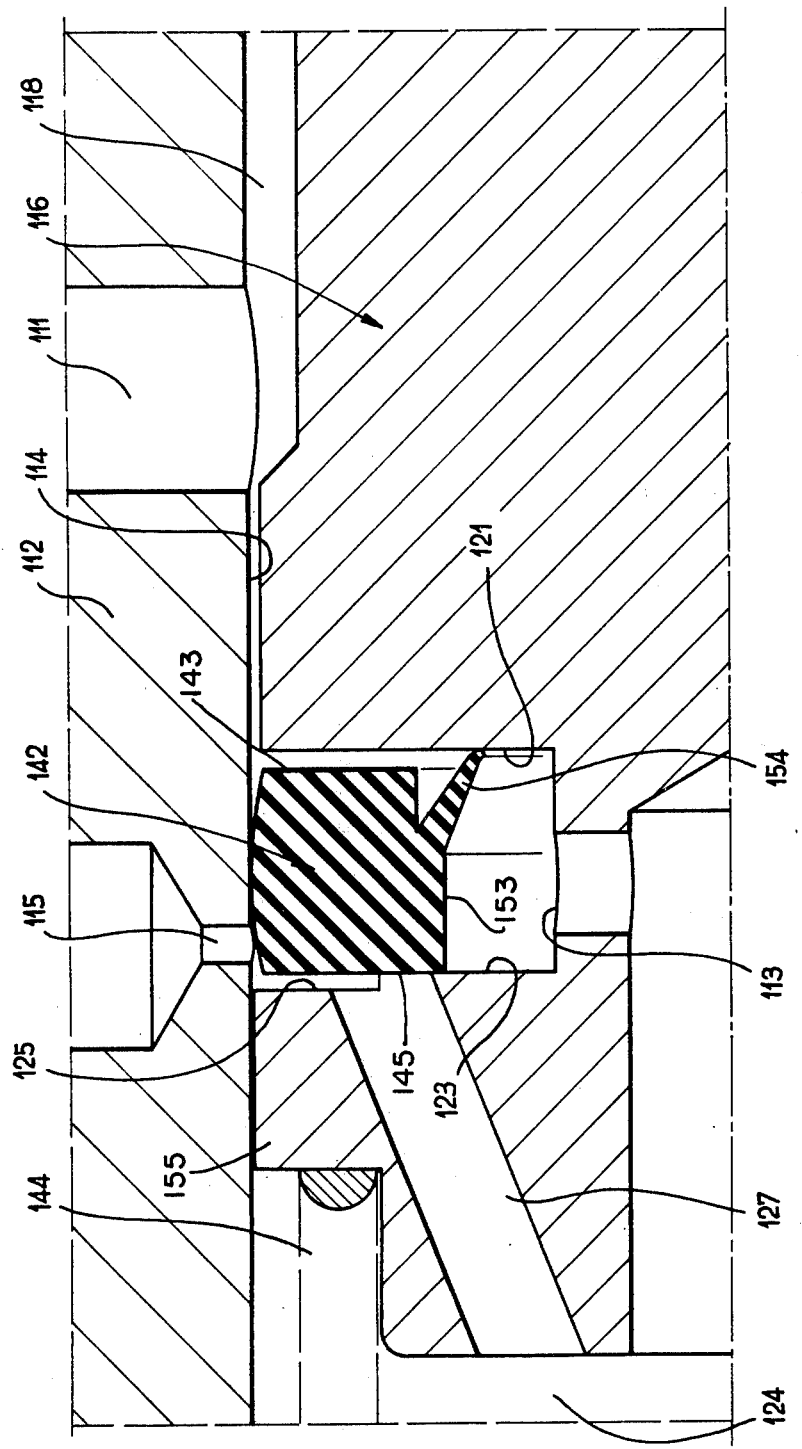
FIG. 6 is an enlarged view of the portion limited by dotted line 6, of the master cylinder illustrated in FIG. 5.

Referring now to FIG. 6, groove 113 has radial faces 121 and 123. Radial face 121 defines a shoulder which is slightly kept away from the facing contacting face 143 of ring 142, when the piston occupies its rest position. Radial face 123 defines a stop against which radial face 145 of ring 142, comes into contact. A lip 154 which axially projects from the inner diameter portion 153 of ring 142 comes into contact with radial shoulder 121, to cooperate with the latter to define a non return valve permitting fluid supply to the pressure chamber 124 but preventing fluid flow from the pressure chamber 124 toward annular space or supply chamber 118, when the piston 116 is moved out of its rest position. To complete the description, it will be noted that in the rest position of piston 116, fluid communication between compensation orifice 115 and pressure chamber 124, occurs through a passage provided by a space between ring 142 and a shoulder 125 of face 123, and through a passage 127 in the head 155 in the piston 116.

MODE OF OPERATION OF THE INVENTION

When the piston 116 is urged into its rest position, the action of spring 144, ring 142 abuts radial face 123, but fluid communication between nipple 122, i.e. the fluid reservoir (not shown), and pressure chamber 124, is allowed by means of compensation orifice 115.

When the brakes are actuated, this communication is interrupted immediately after the vehicle operator has depressed the brake pedal, as soon as annular ring 142 has moved past compensating orifice 115. In effect, radial face 121 has come into contact with contacting surface of ring 142 and the latter thereafter is moved toward the left together with piston 116. As a consequence, the pressure which prevails in pressure chamber 124 increases.

During the return stroke of the piston 116, it may happen that the friction forces acting on ring 142, are so great that radial face 121 is disengaged from the corresponding contacting face of ring 142. However, as long as the pressure which prevails in pressure chamber 124 is greater than pressure which prevails in annular space 118, return fluid communication is prevented by lip 154 which remains in contact with shoulder 121.

In the event that the piston 116 has not yet reached its rest position, and that a decrease occurs in pressure chamber 124, caused for instance by a delay in return of fluid from the brake actuators, or by fluid leakage having occured during braking, or following a bleeding operation, the lip 154 is deformed under the influence of the pressure difference which has been created between the supply chamber 118 and the pressure chamber 124, so as to permit further fluid supply of the pressure chamber.

It will also be noted that the invention has been described in relation with a single master-cylinder, it is obvious that such invention could as well be performed in its application to a tandem master cylinder which would comprise two pressure chambers separated by a floating piston. In this case, each piston of the master-cylinder would be equipped with a ring comprising a lip.

What we claim is:

1. Hydraulic master cylinder comprising a housing having a bore therewithin, a piston slidably mounted in said bore for separating a supply chamber connected to a fluid reservoir from a pressure chamber connected to a hydraulic utilization device, said piston having a head adjacent to the pressure chamber with a radial shoulder thereon, a valve formed by an elastomeric annular ring mounted with radial play around the piston head, said ring being slidably and sealingly mounted in said bore and disposed with axial play between said radial shoulder and a stop means, said ring controlling fluid communication between the supply chamber and the pressure chamber through the engagement of one of its lateral radial contacting faces with said radial shoulder, said communication occurring when the piston occupies its rest position and interrupted when the piston is moved from its rest position, said ring having an annular resilient lip projecting from said ring toward said radial shoulder to define a non return valve permitting fluid communication between said supply chamber and said pressure chamber while in the rest position and preventing fluid flow from the pressure chamber toward the supply chamber while permitting fluid flow from the supply chamber toward the pressure chamber when the piston occupies a position away from its rest position and the pressure in the pressure chamber is larger than the pressure in the supply chamber, said lip being adjacent said one of the lateral contacting faces and projecting toward said radial shoulder beyond the plane of said one of the lateral contacting faces.

2. Hydraulic master cylinder according to claim 1, wherein the lip, when in its non-deformed position, extends in the direction of the center of the elastomeric ring.

3. Hydraulic master cylinder according to claim 1, wherein the lip is integral with the elastomeric ring.

4. Hydraulic master cylinder according to claim 1, wherein the stop means are slidably mounted on the piston head and resiliently urged into contact with an abutment formed on the piston head.

5. Hydraulic master cylinder according to claim 4, wherein said stop means are formed by a rigid disc adjacent to the other lateral contacting face of the elastomeric ring, the axial distance between said radial shoulder and the face of said rigid disc, opposite to said radial shoulder being larger than the axial distance separating the two lateral faces of said elastomeric ring, when the rigid disc is urged into contact with its corresponding abutment thereby defining said axial play, said play being smaller than the maximum axial distance between said one of the lateral contacting faces and the free end of the lip, when the latter occupies its non-deformed position.

6. Hydraulic master cylinder according to claim 5, wherein the rigid disc is urged against its corresponding abutment by an intermediate spring, said master cylinder also comprising a cup which is urged against a corresponding abutment of the piston head, with the intermediate spring being disposed between said rigid disc and said cup, a return spring having a force larger than that of the intermediate spring urging said cup against its corresponding abutment to urge said piston against a stop which is fixed relative to the housing, thereby defining the piston rest position.

7. Hydraulic master cylinder according to claim 6, further comprising a spacer ring cooperating with the elastomeric ring, said spacer ring being disposed adjacent said annular ring contacting face with faces said radial shoulder, said spacer ring being slidably disposed in an annular cavity defined between the inner wall of said bore and the peripheral surface of a stepped portion of the piston which is adjacent to said shoulder, said annular cavity communicating with the supply chamber and being partially defined by another shoulder of the piston, a radial space being provided between said piston and the spacer ring to permit fluid supply to the pressure chamber, said spacer ring cooperating when the piston is in its rest position with a stop provided in the housing for holding the spacer ring against the action of the intermediate spring, said elastomeric ring moving such a distance that the free end of the resilient lip is moved away from the radial shoulder, thereby permitting uninhibited fluid communication between the supply chamber and the pressure chamber.

8. Hydraulic master cylinder according to claim 7, wherein the stop for the piston in the rest position and the stop for the abutment ring are formed by the extension of a plug mounted on the housing and adapted to connect a fluid reservoir to the supply chamber.

* * * * *